United States Patent [19]
Minematsu et al.

[11] Patent Number: 4,833,312
[45] Date of Patent: May 23, 1989

[54] SYSTEM FOR TRANSACTIONS BETWEEN FINANCIAL INSTITUTIONS AND CUSTOMERS

[75] Inventors: Nobuo Minematsu; Masao Karahashi; Munekatsu Ota; Koyo Matsumae; Hashime Takada, all of Tokyo, Japan

[73] Assignee: Oki Electric Industry Co., Ltd., Tokyo, Japan

[21] Appl. No.: 174,878

[22] Filed: Mar. 29, 1988

[30] Foreign Application Priority Data

Mar. 31, 1987 [JP] Japan ............................... 62-076134

[51] Int. Cl.[4] ............................................ G06F 15/30
[52] U.S. Cl. .................................. 235/379; 235/380
[58] Field of Search ............................... 235/379, 380

[56] References Cited

U.S. PATENT DOCUMENTS 4,650,975 3/1987 Kitchener ....................... 235/379 X

FOREIGN PATENT DOCUMENTS 54-95146 7/1979 Japan .
55-28161 2/1980 Japan .

*Primary Examiner*—Harold I. Pitts
*Attorney, Agent, or Firm*—Spencer & Frank

[57] ABSTRACT

Customers input their transaction data by a first processing device. When a second processing device is in a situation capable of immediate processing, the input transaction data is sent to the second processing device. But when the second processing device is not in a situation capable of immediate processing, the input transaction data is stored in a memory in the same order in which inputs have been completed.

13 Claims, 18 Drawing Sheets

FIG. 17

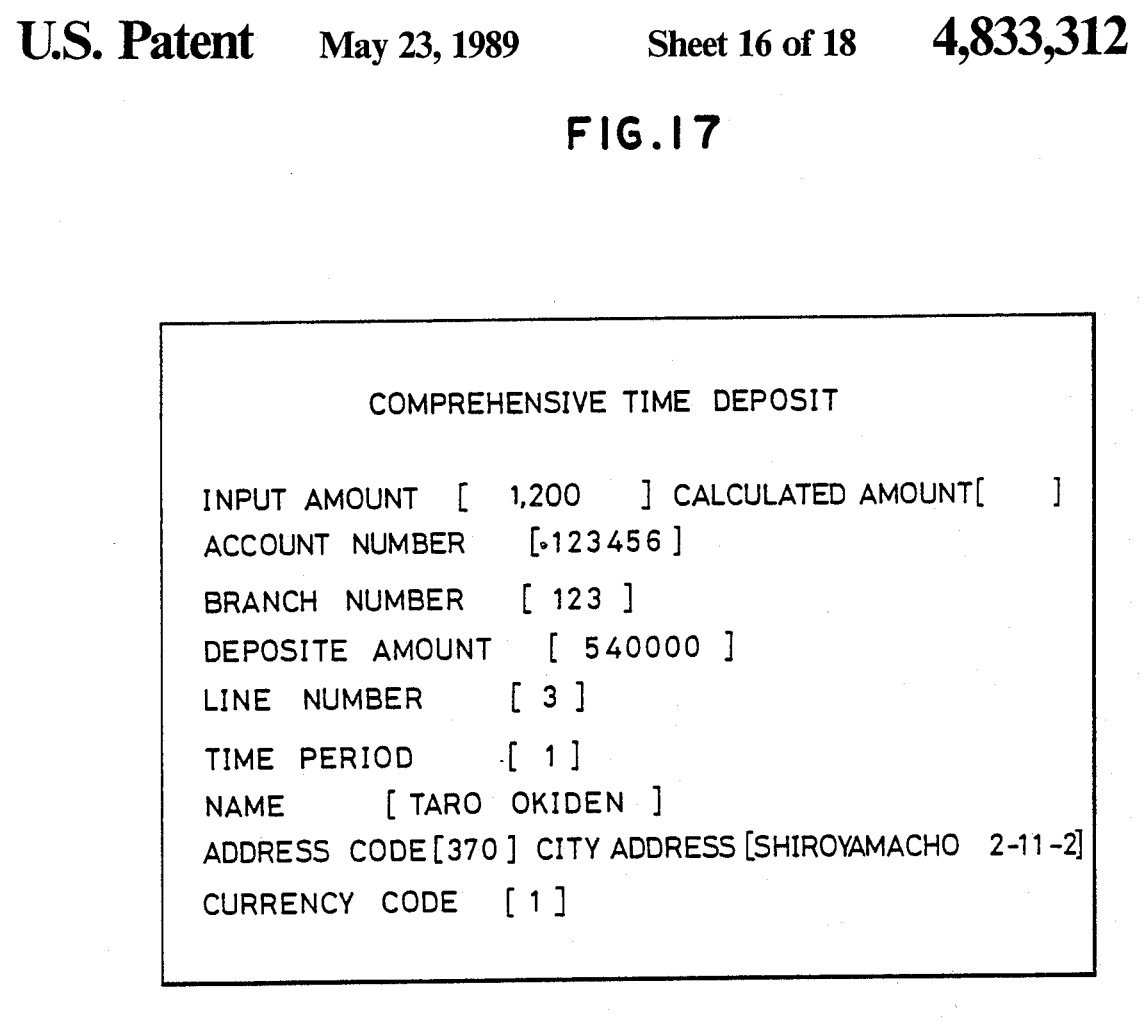

COMPREHENSIVE TIME DEPOSIT

INPUT AMOUNT [ 1,200 ] CALCULATED AMOUNT[ ]

ACCOUNT NUMBER [123456]

BRANCH NUMBER [ 123 ]

DEPOSITE AMOUNT [ 540000 ]

LINE NUMBER [ 3 ]

TIME PERIOD [ 1 ]

NAME [ TARO OKIDEN ]

ADDRESS CODE [370] CITY ADDRESS [SHIROYAMACHO 2-11-2]

CURRENCY CODE [ 1 ]

SYSTEM FOR TRANSACTIONS BETWEEN FINANCIAL INSTITUTIONS AND CUSTOMERS

BACKGROUND OF THE INVENTION

This invention relates to a system to help financial institutions transactions with customers at their lobbies and places of business.

Financial institutions are coping with various social environmental changes such as finance liberalization by striving for rationalization and efficiency promotion and are trying to give better customer services in order to increase profits. Some of the challenges facing them are rationalizing transaction and follow-up work, promoting more automation for work that is not very profitable, and improving the quality of customer services (better consultation services, access to information etc.). But one of the greatest rationalization challenges will be introducing a new system which will not only facilitate automation, but will also handle transactions more effectively than in secondary on-line system.

Transaction work, which is the contact point between financial institutions and their customers, began with the 2nd line system (the system in which the terminals are disposed near and manipulated by the financial institution employees at the back of the tellers). Later, changes were made with the 1st line/2nd line linkage system (the system in which the terminals are disposed near and manipulated by the tellers as well as the employees behind the tellers and these two types of the terminals are manipulated to complete the transaction) and the 1st line completion system (the system in which transaction can be completed by manipulation of the terminals disposed near the tellers). But in the future, it will be necessary to use more advanced systems such as the 0th line/1st line linkage system, the 0th line completion system, and the home/0th line linkage system. The term, "0th line," in this application refers to a device operated by the customer in the lobby or the place where business transactions are conducted.

At present, various automatic machines such as the CD and the ATM are widely used for simple transactions, but there are very few transaction which can be handled by automatic machines. It is important to implement an excellent new system for transaction work to improve rationalization, efficiency promotion and customer services. Japanese Patent Laid-Open Nos. 95146/1979 and 28161/1980 describe devices used in systems intended to solve these problems and meet these challenges. The system disclosed in the Patent Laid-Open No. 95146/1979 separates the transaction system into 2 parts: a pre-transaction device which the customer inputs to contact the people responsible for the initial stage of the transaction: and a post-transaction device which carries out the transaction desired by the customer. The number of pre-transaction devices installed will be greater than the number of post-transaction devices installed. So when pre-transaction time accounts for a major portion of the total transaction time, there is a significant reduction in transaction time.

The system disclosed in the Patent Laid-Open No. 28161/1980 aims at shortening the input time required by employees by making it unnecessary for customers to fill out forms. Instead, customers have their own transaction cards and operate the keyboards themselves, so that there is direct input into a transaction device.

However, there are some problems in the prior arts. First, problems with the transaction device described in the Patent Laid-Open No. 95146/1979 (hereinafter referred to as document 1) will be considered.

1. In financial institutions, it is important to shorten the time required for each transaction while at the same time remaining capable of flexible responses to fluctuations in the number of transactions per time unit. Because the number of transactions per time unit at the places where financial institutions do business varies very much depending on the time or day, at peak times, this number might be more than 10 times higher than at normal times. It is therefore essential to deal with such fluctuations in a flexible manner.

At present, financial institutions try to maintain flexibility in their transactions with customers by first completing only the initial stage of the transaction (having customers fill out forms and then submit them). In the system widely used at present, customers wait to be called by one of the employees while sitting in comfortable chairs or sofas in the lobby. But when the number of those transaction devices described in document 1 is decided on the basis of how many transactions take place on a normal day or during normal hours, there will be long lines of customers waiting to use the pre-transaction device during peak times. Because customers cannot even begin the first stage of a transaction, they will not be able to relax, and a situation is likely to develop where customers become irritated while waiting to begin the pre-transaction stage. This is because the construction of these transaction devices is such that the pre-transaction device can not accept for a long time many transaction inputs over the capacity of the post-transaction device.

Furthermore, if many additional transaction devices are installed in order to handle peak times adequately, the result will be a very expensive investment for financial institutions.

2. In these transaction devices, transaction success or failure judgments are made in the pre-transaction stage, depending on the results of communication with the data center and its responses which in turn depend on the content of transaction requests made by customers. Therefore, the time elapsing until completion of the pre-transaction process is long when compared with those situations where the process of communication with the data center is included in the post-transaction stage. So it is likely that there will be long lines of customers waiting to use the pre-transaction devices during peak times. Also, when communication with the data center is included in the pre-transaction process, for example when a customer performs only the pre-transaction for deposit and returns without doing the deposit post-transaction (making payment to the financial institution) because of some inconvenience, there will be a situation in which the entire transaction is not completed and the correspondence transaction with the center is just wasted.

3. In these transaction devices, when several post-transaction devices are all engaged in post-transaction activity after the completion of pre-transaction processes, there is no way of informing customers of the post-transaction device they should go to in order to finish their post-transaction as quickly as possible. And there is also no way of guiding customers to the post-transaction device which is most suitable for them. Customers, therefore, have to rely on their own intuition, and line up for the post-transaction device which they feel will help them to finish their transaction as quickly as possible. Therefore, there will be times when one customer will finish the pre-transaction process after another customer but begin the post-transaction process earlier than that customer at a different post-transaction device. When this kind of situation occurs, in which customers who begin later finish more quickly than customers who had begun earlier, there will be some bad feelings among those customers who had begun earlier. And it is also possible that the image of a financial institution which has installed such transaction devices will suffer because of this.

4. Financial institutions often prefer to limit transactions to separate categories such as savings, money orders and loan consultations, or deposit-withdrawals and money transfers. Transaction devices (especially post-transaction devices) can be constructed with good cost-performance in these categories, and training can be given in a short time to those employees who are experienced in such limited transactions.

However, in these transaction devices, when the post-transaction device is not in a customer-waiting situation, it cannot be assigned to a specific customer. Therefore, these transaction devices cannot be used so easily by those financial institutions which have to manage many transaction corners for only specific transaction categories.

5. These transaction machines have the following problems in checking the identity of customers to verify whether or not the customer who is about to perform a post-transaction operation is really the same person who just carried out a pre-transaction.

(1) When things such as magnetic cards are used for identity verification, post-transaction verification time can be shortened, but a magnetic card reader will have to be installed so in the post-transaction device as well as in the pre-transaction device. And this means cost increase. Furthermore, requiring customers to use their magnetic cards twice means that customer service will be inferior to other transaction devices which are currently widely used.

(2) When customers input such things as secret codes required for customer identity verification, customer service will also deteriorate because some customers take a long time for input and there are so many human factors involved in code input, input confirmation etc. Also due to secret code input mistakes, there occur some additional problems to be solved (for example, problems such as how to carry out a second input for secret code numbers, or timing for erasing customer data from a previous input).

Next, consideration will be given to some problems with the bank transaction system described in Patent Laid-Open No. 28161/1980 (hereinafter referred to as document 2). In recent years, the ratio between the number of CD (cash dispenser) cards (which are cards used most commonly) and the number of conventional deposit accounts averages about 57.3% at 11 city banks in Japan where the use of CD cards is the most prevalent (according to data results of finance marketing research survey group in Japan, September, 1984). But because there are some customers who do not like to use CD cards, having such cards cannot become an essential condition for bank transactions. However, such transaction cards are an essential condition in the bank transaction system described in document 2. This system cannot be used by customers who do not have transaction cards (customers who want to use passbooks and seals for transaction).

Furthermore, customer service suffers very much in this system because it is extremely difficult to input the data required for the complicated process through such input keyboards and display devices used as in automatic transaction devices, current CDs or ATMs.

For example, although it is necessary to solve problems of input methods for Japanese characters (KANJI) and syllabaries (KANA) and too long input time to key-in a large amount of input data, there is no description of solution of such problems in document 2.

The following is a summary of as yet unsolved problems involved in the prior arts desribed above:

(a) It is not possible to have flexible responses to fluctuations in the number of transactions per time unit.

(b) When customers have to move from an input stage to the actual stage of depositing/withdrawing etc., there is no way to guide them properly.

(c) The system cannot cope effectively with many transaction categories.

(d) Because cards and code numbers are essential for transactions, it is impossible to carry them out using passbooks and seals.

(e) There is no input equipment which can be operated easily by cutomers.

SUMMARY OF THE INVENTION

An object of the invention is to solve problems such as those just described above.

Another object of the invention is to provide a transaction system which requires less time without the need to fill out forms.

According to the invention, there is provided a system for transactions between financial institutions and customers comprising, a first processing device for inputting transaction data by operations of customers, a plurality of second processing devices for performing actual processing on such as passbook registering, cash depositing and withdrawing etc. by operations of tellers, a first memory for storing the input transaction data in the same order in which the input has been completed, and a second memory for registering the second processing device which is in a situation capable of immediate processing, wherein when the transaction data input has been completed by the first processing device, the second processing device in the situation capable of immediate processing is searched from the second memory, and when there is the second processing device registered in the second memory, the transaction input data is sent to the second processing device, and when there is no second processing device registered in the second memory, the transaction input data is memorized in the first memory.

The following effects can be expected from this invention. Namely more rational, efficient transactions can be made. More specifically, reductions can be made in the number of terminals and tellers in the final stages of transactions. The transaction process is simplified, and the time required for the entire transaction is shortened. The customer is kept better informed, and a high level of customer service is possible. Providing information, which used to require filling out forms, is now done electronicallly, with no need for paperwork. An orderly sequence of service is maintained because transactions advance in accordance with the sequence of input completion by customers. This prevents possible bad feeling or loss of face among customers while at the same time helping to improve the image of the financial institution. There is less crowding during peak times because customers are guided automatically to whatever area is most appropriate for their situation and because they understand when input should be done and when a transaction stage is over. Tellers do not have to have special knowledge about complicated input processes, so they do not have to receive a high degree of training.

BRIEF DESCRIPTION OF THE DRAWINGS

FIG. 17 shows a 1st line terminal screen display.

DETAILED DESCRIPTION OF THE PREFERRED EMBODIMENT

The following is a detailed explanation of embodiments of this invention in accordance with appended drawings. The words, "actual processing" are used here to refer to processing the following: cash, both paper money and coins; securities, checks, bills etc.; passbooks and certificates for various kinds of deposits.

Figure 1:
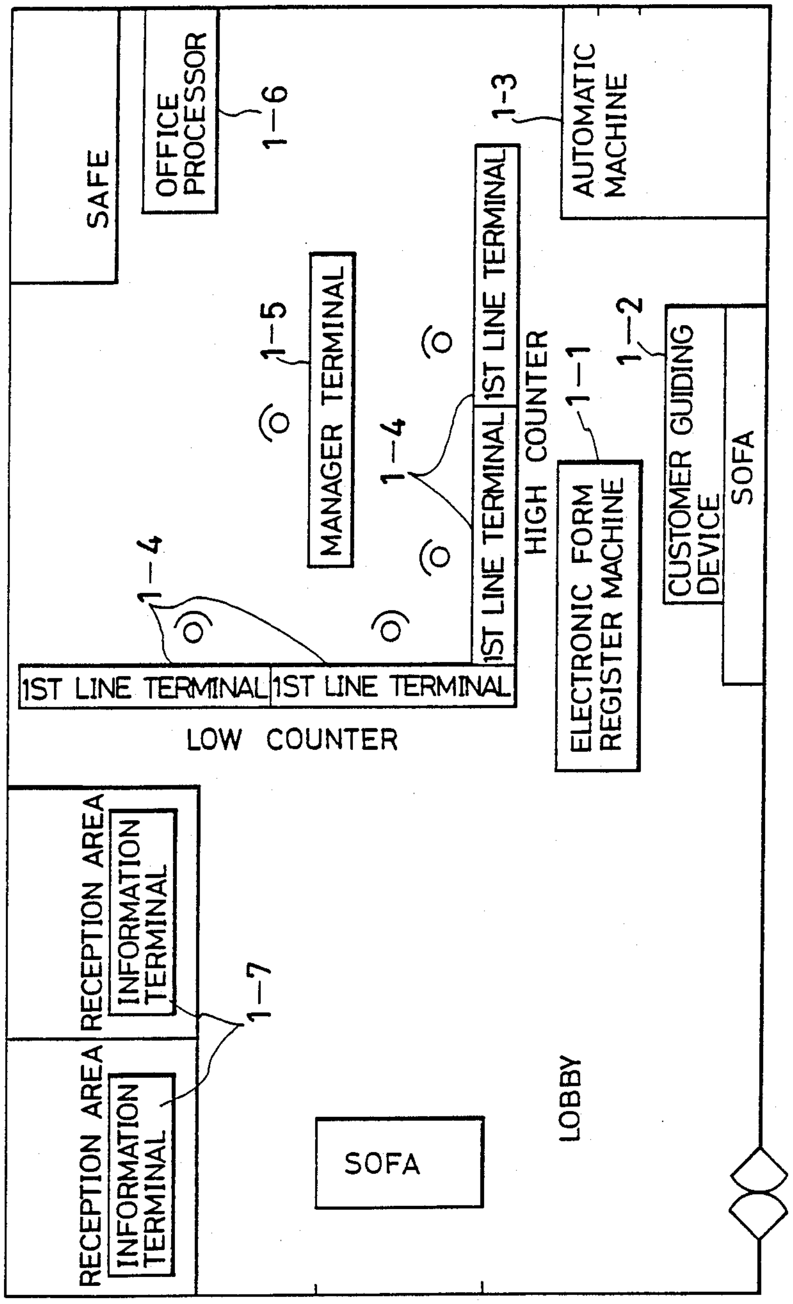
FIG. 1 is a plan view showing a layout in lobbies and places of business which use the transaction system according to this invention.

FIG. 1 shows a layout for lobbies and places of business which use the transaction system of this invention. The equipment installed in the lobby are: electronic form register machine 1-1, device for giuding customers 1-2, and various automatic machines 1-3 such as devices for automatic savings and withdrawals. 1st line terminals 1-4 are installed on low and high counters. Installed behind these are: manager terminal 1-5, office-processor 1-6. Information terminals 1-7 having similar functions with 1st line terminal 1-4 are installed in the reception area.

The transaction system of this embodiment has 3 major categories: deposits, money orders and loans. In all categories, an input process and an actual process are done separately. The electronic form register machine 1-1 is the device for input process operated by the customer. It is installed in the center of the lobby. The 1st line terminals 1-4 and automatic machines 1-3 are the devices which carry out the actual processing. Information terminals 1-7 present information which is appropriate to the needs of the customer, based largely on the input data from the customer. The place where processing devices are put is referred to as the "processing area."

First, an outline will be described dealing with the main points of the transaction system in this embodiment.

A customer selects the desired type of transaction (one of categories) by using the electronic form register machine 1-1. After the completion of transaction data input, the display of electronic form register machine 1-1 shows a message guiding the customer to whatever place is most appropriate for the type of transaction that has been selected. A number card is then issued automatically on which are printed serial number in each actual processing units (categories). At this point, a display shows an estimate of the time the customer will probably have to wait until the transaction is completed. At the same time, a judgment is made about the processing area situation. If there is a disengaged actual processing device, the customer is guided to the processing area, but if there is no disengaged device yet, the customer is guided to a comfortable chair or sofa. When there are several devices processing the same type of transaction, the customer is guided to the processing device at which the transaction can be completed most quickly, it being judged from the data of order queue (file request order queue).

In the processing area where 1st line terminals 1-4 are placed, when a teller depresses a specific key on the operating keyboard of 1st line terminals 1-4, then, the 1st line terminals 1-4 etc. take the input data to be processed from the electronic form register machine and it appears on the display. At this point, if the customer has been guided from the electronic form register machine 1-1 to a sofa, he is then guided to a 1st line terminal 1-4 by the panel and voice guidance of the customer guiding device 1-2. The customer then hands over to the teller before 1st line terminal 1-4 the number card which has been issued by electronic form register machine 1-1 together with whatever else is necessary for processing transactions such as passbook, cash, seal etc. The teller then does an identity check by examining the number card which he received from the customer, and the number card data shown on the display. Transactions for passbook, cash etc. are then implemented.

Important items such as amount of money are shown on a special display for customers at the same time that they are shown on a display of the 1st line terminal 1-4. The transaction is completed with an operation by the customer for confirming the identity of the content of the transaction.

When using the automatic machines 1-3 in the processing area, as soon as the customer inputs the number printed on the number card from the operation panel of the automatic machine 1-3, input data to be processed is taken from the file section of the electronic form register machine 1-1. The display then shows all the input data for verification by the customer. When the customer depresses the check key, automatic machine 1-3 performs the required processing for things such as passbook, cash etc., and the transaction is completed.

In electronic form register machine 1-1, the form formats are stored for all categories with the customer input items. After input, the customer is guided to the most appropriate processing areas. If additional conditions for guidance are needed, it is possible to set them for manager terminal 1-5. For example, if input is done for specific customer data, when that customer comes to the transaction area and begins to operate the electronic form register machine 1-1, this information will be communicated to the manager terminal 1-5. It is also possible for the manager to guide the customer to the reception area. Furthermore, when some equipment such as 1st line terminals 1-4 and automatic machines 1-3 has troubles, information about the troubles is provided to the manger terminals 1-5 and the customer can be guided to another processing area by inputting trouble information from the manager terminal 1-5.

The electronic form register machine is also equipped with other functions such as inputting seal marks. In conventional systems, when a customer mistakenly tried to use someone else's seal, the teller would check originally registered marks. As a result, because this was the first time the seal had been judged to be the wrong one, much business time was lost. In this embodiment, however, in the electronic form register machine 1-1, at the time of input operation the seal marks are input by inserting the seal into the appropriate holes. Automatic identification is done by checking the seal original register file, so judgments about seals being different from the original can be made there, without any need to bother the teller with this work.

The transaction system in this embodiment includes 0th line completion and 0th line/1st line linkage systems using the electronic form register machine 1-1 referred to above. This system is capable of achieving many objects simultaneously, such as eliminating the need to fill out forms, rationalizing transaction work, 0th line completion processing for special work, reducing the amount of work that has to be done by tellers, and shortening the time customers have to wait.

The following connection diagrams, block diagrams, construction drawings and flow charts will help to give a more detailed explanation of this embodiment.

Figure 2:
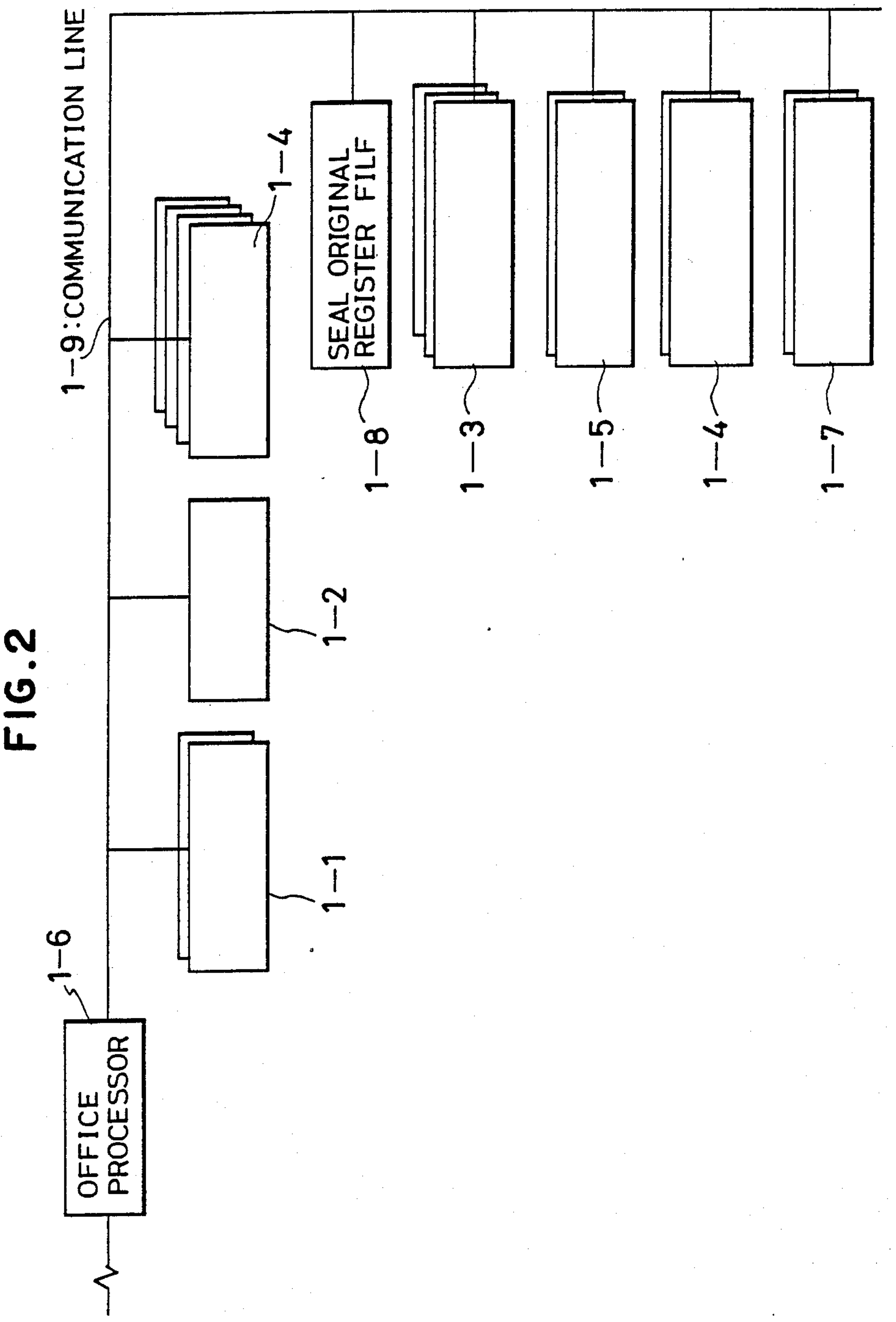
FIG. 2 is a block diagram showing connection of each device in FIG. 1.

FIG. 2 shows connection configuration for each device which is installed in the lobby and place of business shown in FIG. 1. The lobby communication line 1-9 is connected under control by office processor 1-6 to the following: electronic form register machine 1-1, customer guiding device 1-2, 1st line terminals 1-4 (on high and low counters), seal original register file 1-8, automatic machines 1-3, manager terminals 1-5, information terminals 1-7 etc. Data communication is possible between and among these devices. Office processor 1-6 is connected to the data center through communication lines. Connection with the data center is also possible through other office processors. The number of each of these devices installed can be increased or decreased in accordance with the needs of any lobby.

Figure 3:
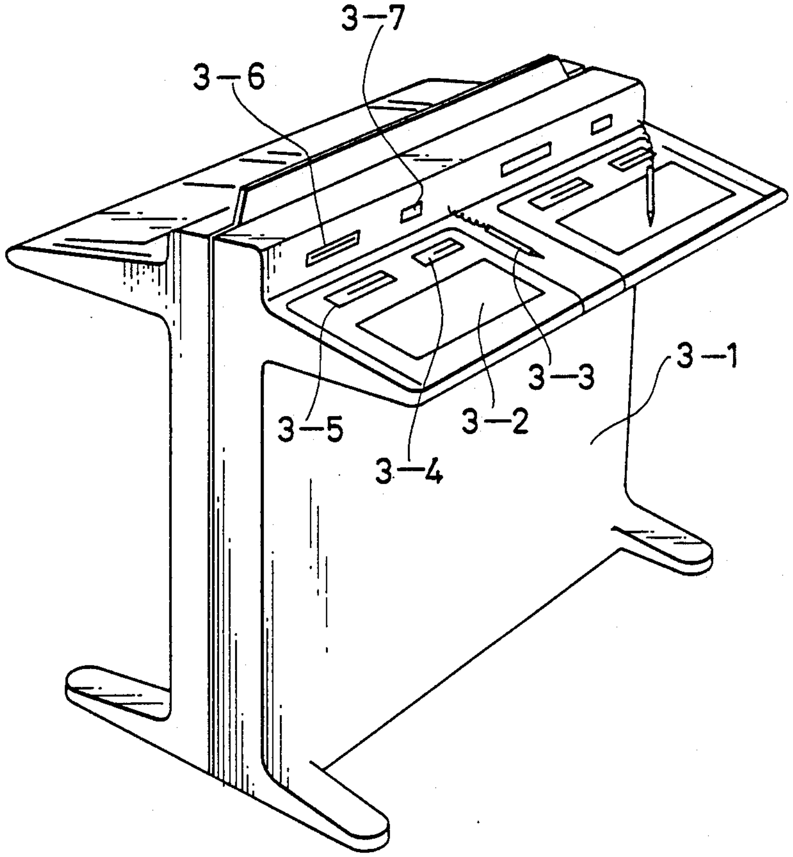
FIG. 3 is a perspective view of an electronic form register machine.

FIG. 3 is a perspective view of electronic form register machine 1-1, the center of this embodiment. 3-1 is a body of electronic form register machine 1-1 which can be operated by 4 persons in this embodiment; 3-2 is a display combined input panel to be explained in more detail later; 3-3 is an input pen; 3-4 is a CD card/IC card combination reader-writer; 3-5 is a passbook stripe reader; 3-6 is a receipt printer; 3-7 is a seal reader. Controls, files etc. are installed inside the devices. The seal reader 3-7 is optional. Some models do not have it and other models have is as a separate unit.

Figure 4:
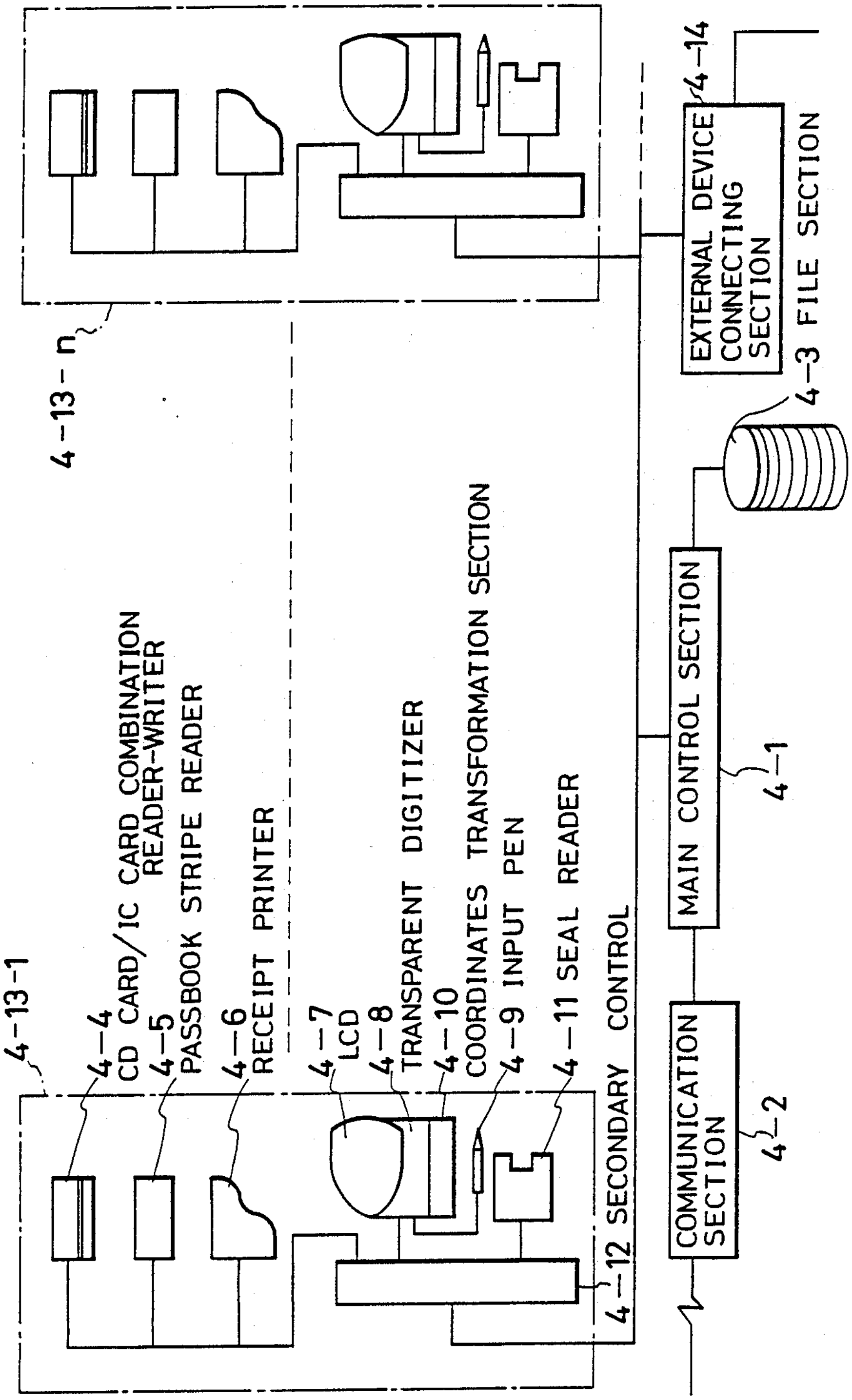
FIG. 4 is a function block diagram of the electronic form register machine.

FIG. 4 is a block diagram showing the construction of electronic form register machine 1-1. 4-1 is a main control section, controlling the linkage system and a plurality of electronic form register machines. It also includes such functions as file control, input symbol pattern recognition, and seal identification. 4-2 is a communication section. Data communication with other devices or with the office processor 1-6 is done through section 4-2 under control by main control 4-1. 4-3 is a file section. This controls all files through main control 4-1. This file section 4-3 comprises such things as an input data pending file which contains customer input data, a form format file which contains form formats for every transaction subject related to any customer input item, a guiding condition file containing guiding conditions for customers, and a guidance phrase file containing all the guidance phrases used to help customers during input operations. 4-4 is a CD card/IC card combination reader-writer (corresponding to 3-4 in FIG. 3). When customers have CD cards or IC cards, it is used as automatic input means. 4-5 is a passbook stripe reader (corresponding to 3-5 in FIG. 3). It is used as an automatic input means when passbooks are used for transactions. 4-6 is a receipt printer (corresponding to 3-6 in FIG. 3) which is used to issue the number card after input completion, and the receipts at the time of money transfer transactions by card. 4-7 is a full dot liquid crystal display which displays on the screen various formats required for customer transaction input, such as form, guidance phrases, input image and input symbols (letters). 4-8 is a transparent digitizer. It has the same resolution as display 4-7. By using electrostatic coupling or electromagnetic induction with input pen 4-9, various kinds of information such as the customer's name and address are input by handwriting. These letters and symbols are resolved and transformed into digital data by digitizer 4-8. The liquid crystal display 4-7 and the transparent digitizer 4-8 correspond to display combined input panel 3-2 in FIG. 3. Data such as the customer's name, written by input pen 4-9, is at first shown on the display 4-7 as image data just as they were written. But after that, identified and confirmed letters and symbols are shown immediately. Therefore, if there is some recognition error, it can be corrected right on the spot, thereby preventing recognition errors in the input data as a whole. 4-10 is a coordinates transformation section in transparent digitizer 4-8. It is used in conjunction with display 4-7. Input pen 4-9 is used to input such things as names, addresses etc. comprising letters and symbols which need recognition. In regard to items capable of direct input just by pressing such as item selection or number input, it is able to use unit 5-3 which will be explained later. Which to use is designated on each form format. 4-11 is a seal reader (corresponding to 3-7 in FIG. 3). It inputs seal mark image data. When a seal is registered for example at the time of opening a new account, the image data of input seal marks is shown on display 4-7. A customer identification operation causes the account number and seal mark image data to be sent and registered to the seal original register file 1-8. At the time of withdrawing, when an account number is input, automatic identification is performed by comparing the input seal image data with that which is registered under the account number in the seal register file 1-8. The results of automatic identification are then shown on display 4-7 and input into a pending file with input transaction data. In this manner, identification of the seal which the customer has is performed in the input process, so when the seal does not really belong to the customer, the teller does not have to be bothered with taking care of this. Furthermore, when identification can not be done clearly, the input processing at the electronic form register machine 1-1 is permitted to continue, and the teller in the actual processing decides how to deal with the situation. The display in actual processing area shows the input seal mark image data and the seal mark data from the seal original register file together with seal agreement ratio representing for example numbers of agreement points, while at the same time showing the input data. 4-12 is a secondary control. Its main function is input/output image processing for electronic form register machine 1-1. 4-13 is an input device comprising devices 4-4 to 4-12. 4-14 is an external device connecting section.

When the customer is not identified by seal, but rather by signature, the signature is registered in the original register file instead of the seal mark. The customer inputs his signature with input pen 4-9, or the signature written on specific paper is read by reader 4-11.

Figure 5:
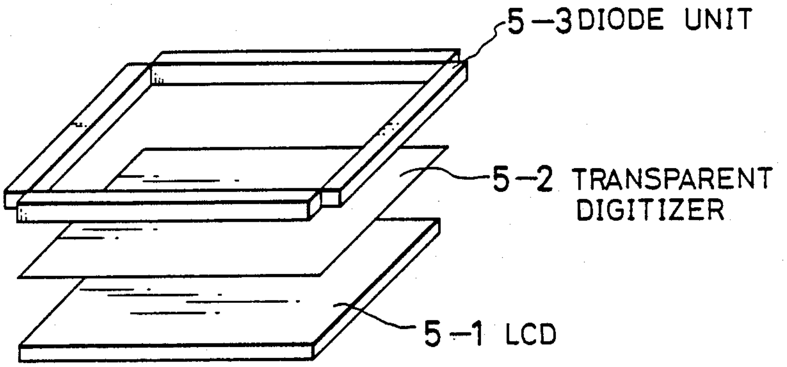
FIG. 5 is a perspective view of a display combined input panel.

FIG. 5 shows the construction of the display combined input panel 3-2 of electronic form register machine 1-1. 5-1 is a full dot liquid crystal display and 5-2 is a transparent digitizer, both of them having resolution capacity of about 0.1 mm. 5-3 is a diode unit for touch-panel comprising diodes emitting and receiving light, with resolution capacity of fingertip detection.

Figure 6:
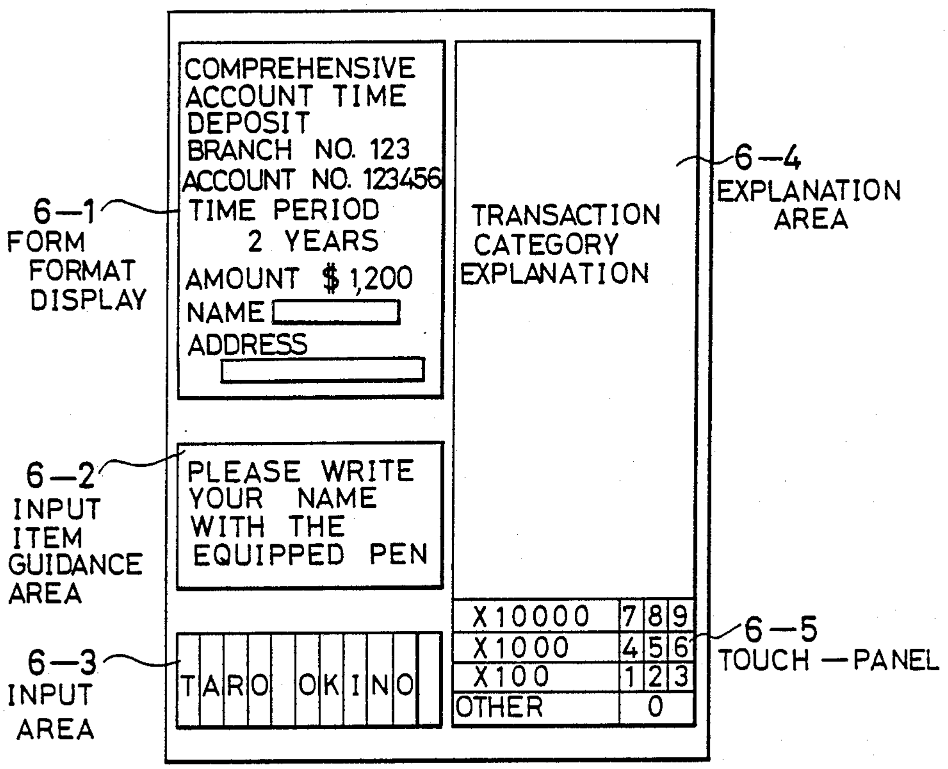
FIG. 6 is a plan view of an input screen.

FIG. 6 shows a screen for the display/input panel 3-2 of the electronic form register machine 1-1. 6-1 is a form format display area showing form input images. The drawing shows a situation in which a time deposit input has already been completed for branch number, account number, time period and amount of money. After this, input will be performed for name and address. 6-2 is an input item guidance area showing guidance phrases for the next input. In this example, guidance is being given so that the customer will input his name with input pen 3-3. 6-3 is a customer input area. This is where letters and symbols are written by hand with input pen 3-3. When the customer's name is input with input pen 3-3 in this area 6-3, the confirmed letters and symboles are immediately shown in the corresponding field. When confirmation operation is carried out by the customer, the confirmed customer's name is input in the form format display area 6-1. 6-4 is the transaction category explanation area. For example, various kinds of information such as time deposit interest rates are shown here. 6-5 is the touch-panel area for inputting numbers.

Figure 7:
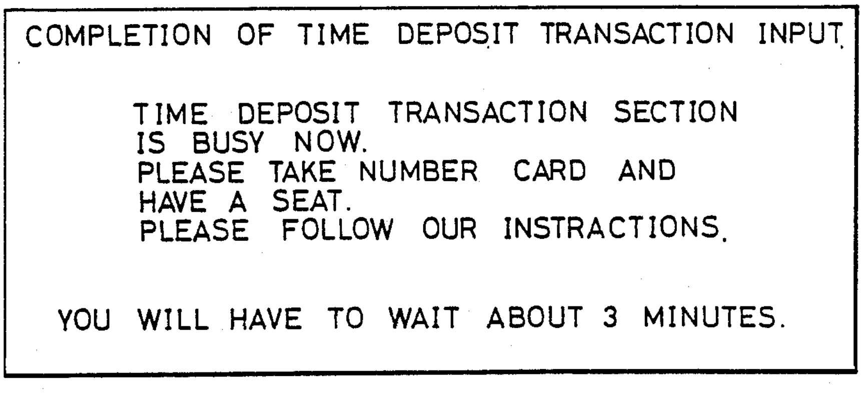
FIG. 7 is a plan view of a screen for guiding customers.

FIG. 7 shows the customer guiding screen on the display combined input panel 3-2 (liquid crystal display 4-7) after customer data input has been completed from electronic form register machine 1-1. When transaction data input has been completed, the electronic form register machine 1-1 checks the situation in the actual processing area. Guidance phrases corresponding to this situation are then shown on the display. When the actual processing area is busy, phrases appear as shown in FIG. 7. But when there is a disengaged actual processing device, a guidance message appears on the display, directing the customer to go to that section of the actual processing area which is most appropriate for the desired transaction category.

Figure 8:
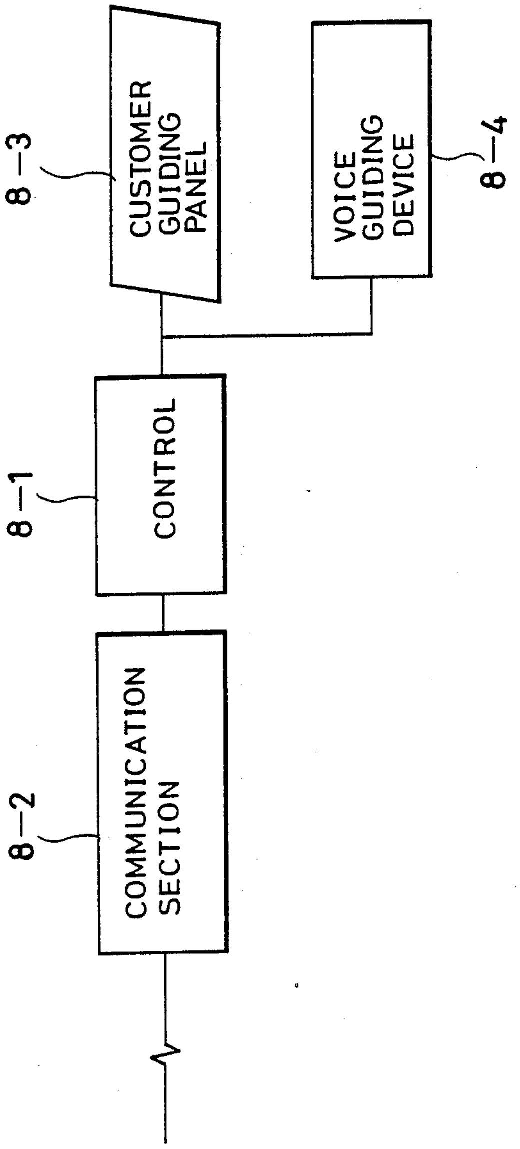
FIG. 8 is a block diagram of a device used to guide customers.

FIG. 8 is a block diagram showing the construction of the customer guiding device 1-2. Customer guiding device 1-2 comprises a control 8-1, a communication section 8-2, a customer guiding panel 8-3, and a voice guiding device 8-4. Control 8-1 reads the information and data which have been received from electronic form register machine 1-1 through the communication section 8-2. The serial number printed on number card of the customer to be guided and the place in the actual processing area to which the customer is to be guided (for example, a number of 1st line terminal 1-4) appear on the customer guiding panel 8-3. At the same time, the same information is given by voice from the voice guiding device 8-4.

Figure 9:
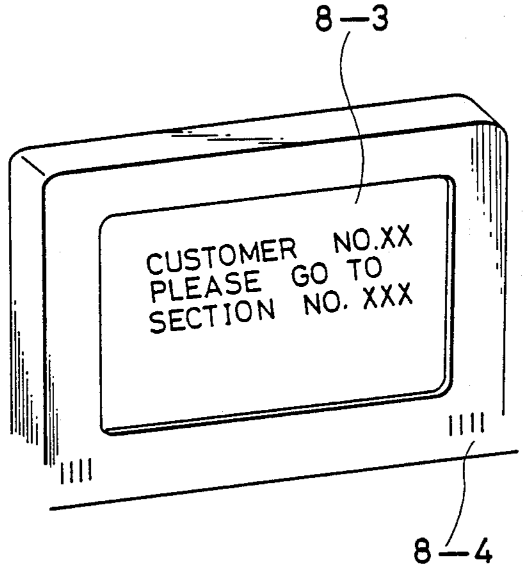
FIG. 9 is a perspective view of a device used to guide customers.

FIG. 9 is a sketch drawing of customer guiding device 1-2. Identical numbers in this drawing correspond to the identical or equivalent elements in FIG. 8. The things that correspond to control 8-1 and comunication section 8-2 cannot be seen in the drawing.

Figure 10:
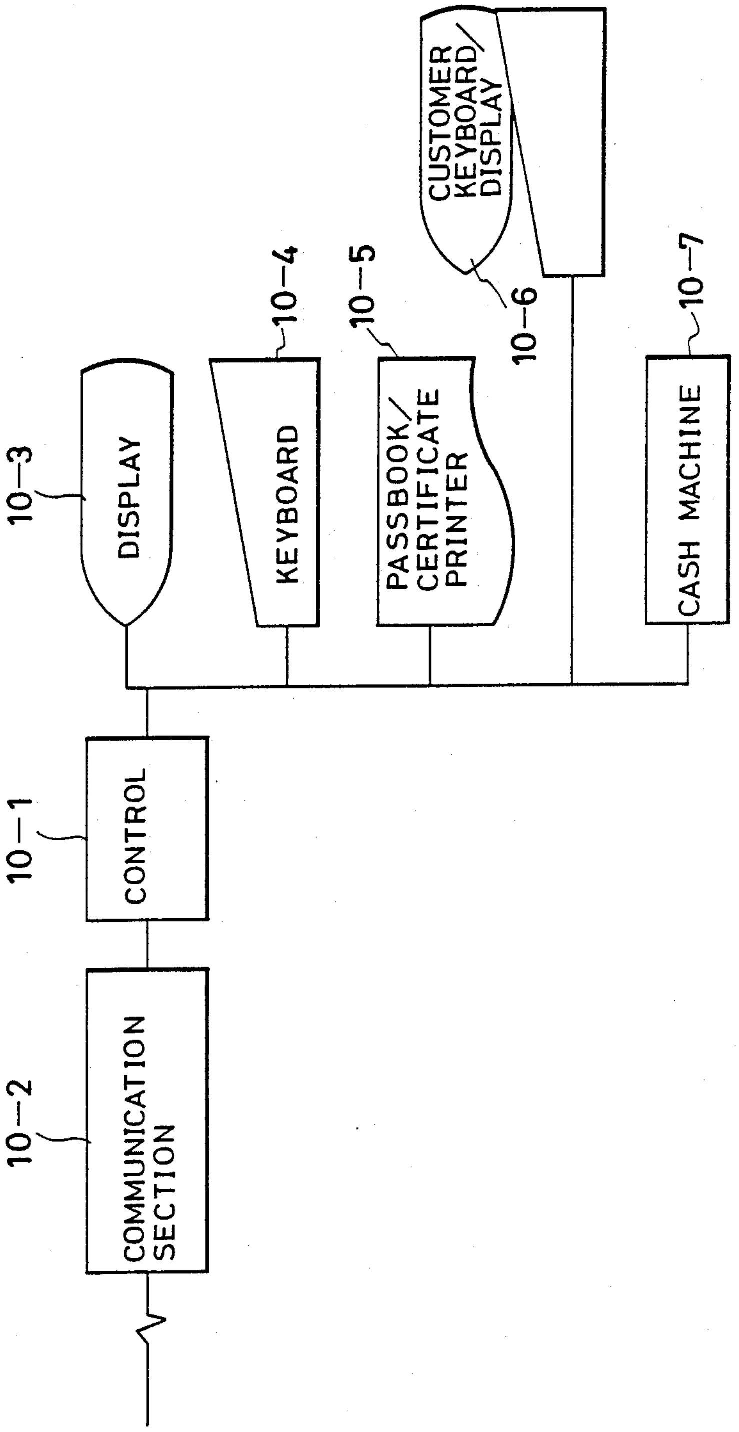
FIG. 10 is a block diagram of a 1st line terminal.

FIG. 10 is a block diagram showing the construction of the 1st line terminal 1-4. The 1st line terminal 1-4 comprises control 10-1, communication section 10-2, display 10-3, keyboard 10-4, passbook/certificate printer 10-5, customer kayboard/display 10-6 and cash machine 10-7. Control 10-1 receives the customer input data block from electronic form register machine 1-1 through communication section 10-2. If necessary, the teller uses display 10-3 and keyboard 10-4 to carry out any correction operations for the input data. The input data is then sent back to the host through communication section 10-2. Then, in accordance with the host's transaction indication, deposit/withdrawing control is performed by cash machine 10-7, or passbook/certificate registry control is done by printer 10-5. The customer keyboard/display 10-6 then is used to have the customer make a final confirmation of such things as the amount of money to be deposited or withdrawn. The customer confirms that this information is correct by depressing the keyboard. Thus the transaction is completed by using only 1st line terminals 1-4 without any need to fill out forms.

Figure 11:
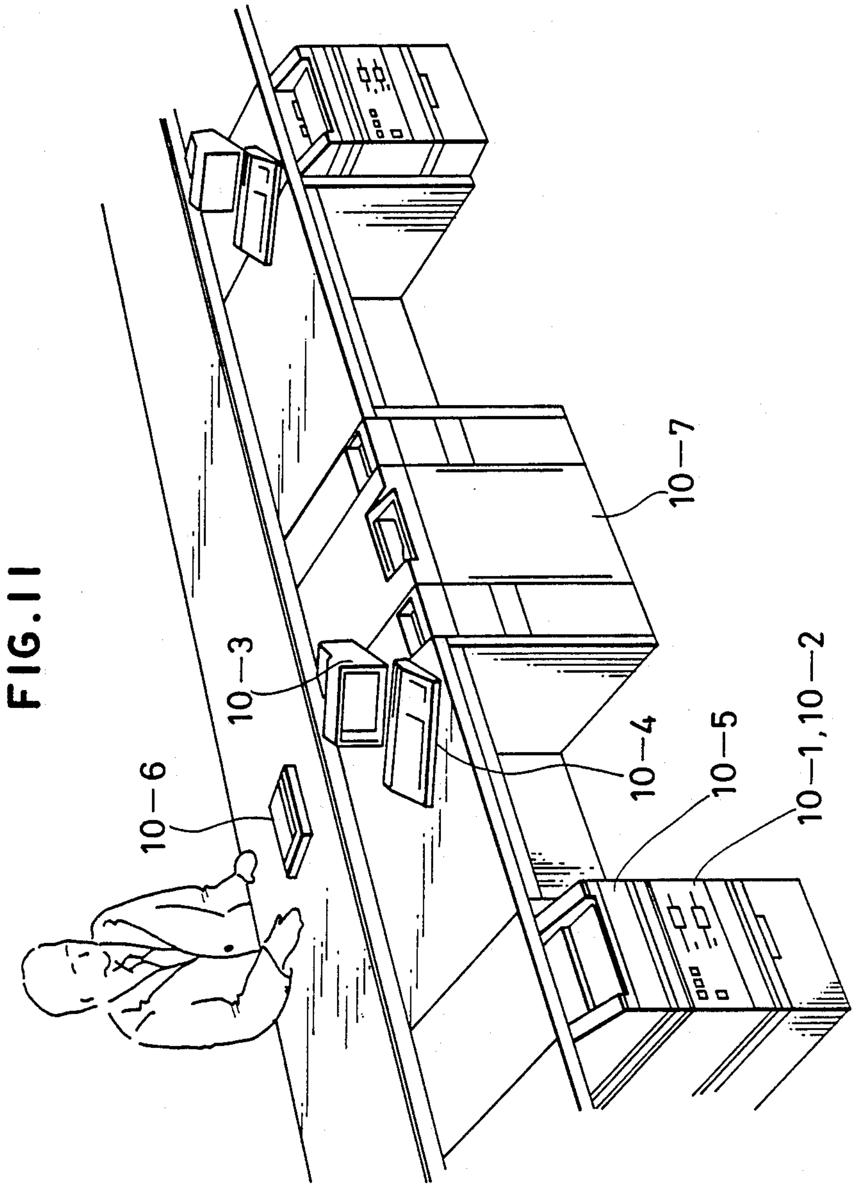
FIG. 11 is a perspective view of a 1st line terminal.

FIG. 11 is a sketch drawing of 1st line terminals 1-4. Identical numbers in this drawing correspond to the identical or equivalent elements in FIG. 10. 1st line terminals 1-4 have the form formats capable of processing among all the formats memorized in electronic form register machine 1-1. When a specific key is depressed on keyboard 10-4 by the teller in order to begin the transaction, the information to request the input data to be transacted is output from the 1st line terminal 1-4 to electronic form register machine 1-1. If the transaction input data is registered in the electronic form register machine 1-1, which can be processed by the 1st line terminal 1-4, this input data will be sent to the 1st line terminal 1-4. The 1st line terminal 1-4 refers to information about the type (category) of transaction contained in the input data received, and show the appropriate format image on the display 10-3. Next, the input data is edited, and displayed in the most appropriate part of the screen.

Because of the linkage operation between the 1st line terminals 1-4 and the electronic form register machine 1-1, the input operation by the tellers into the 1st line terminals from the forms filled by the customers is completely unnecessary, that is used to be done so far for bank transactions.

The teller receives from the customer who has been guided there the number card with printed number and subjects for actual processing such as passbook, cash, check etc. First, the number on the display is checked with the number on the number card. If they are equal, it is confirmed that this is the person who made this data input. Next, after confirming that this customer has a legitimate right to this transaction by using some method such as a seal identity check, for example when the customer wants to deposit cash for a time deposit transaction, the cash received from the customer is calculated by cash machine 10-7. Agreement between the calculated amount and the customer input amount is confirmed simultaneously by the teller on display 10-3 and by the customer on the customer keyboard/display 10-6. And when payment is made for a remittance draft, actual processing begins to be implemented by making confirmation as to whether the remittance draft received from the customer is valid or not, or by checking whether or not this remittance draft is included among the remittance transaction guidance received from the data center. If there is any item in customer input data that needs to be corrected in this confirmation operation, it is corrected so that the transaction screen is completed. When the teller depresses a key on the 1st line terminal 1-4 which indicates that the information on the transaction screen is complete, on customer keyboad/display 10-6 shown is any data about which the customer has to make final confirmation, such as the amount of money to be deposited or withdrawn as shown on the transaction screen. The teller waits until the customer depresses a confirmation key (a special key on the customer keyboard/display 10-6).

When the customer depresses the confirmation key, the 1st line terminal 1-4 transmits the transaction data shown on the transaction screen to the data center. In accordance with data received from the data center, actual processing is then performed for such things as cash deposits or withdrawals, passbook registration etc. When actual processing has been completed by the 1st line terminal 1-4, the teller returns the passbook to the customer after passbook registration has been done by printer 10-5 together with any cash that has been dispensed from the cash machine 10-7, if, for example, the transaction is a withdrawal. By this the transaction is completed.

By using a system that transaction is completed finally through the customer confirmation operations, even banks can complete each transaction right on the spot, in the same way that simple deposit and withdrawal transactions are performed by automatic machines. In other words, because there are no forms to fill out and because the careful examination for each transaction can be done at the time of processing the transaction, the time required for finishing the day's work at closing time can be shortened. "Finishing up" a day's work at a place of business means all the work required to confirm whether or not all the transactions conducted on that day were done correctly. So far, this "finishing up" work has meant confirming the agreement and consistency amoung various totals for the day: the total amount of money denoted on forms, the total amount of money denoted in registers (electronic journals), and the total amount of cash (including bills and drafts). But in the system according to this invention, there are no paper forms to handle. Therefore, the only thing that has to be done is just to confirm agreement between the total amount of money registered and the total amount of cash. Furthermore, the total amounts of cash and money registered have already been calculated precisely by operations of automatic machines or 1st line terminals for each transaction. Therefore, the finishing up work can be done automatically in a very short time.

Figure 12:
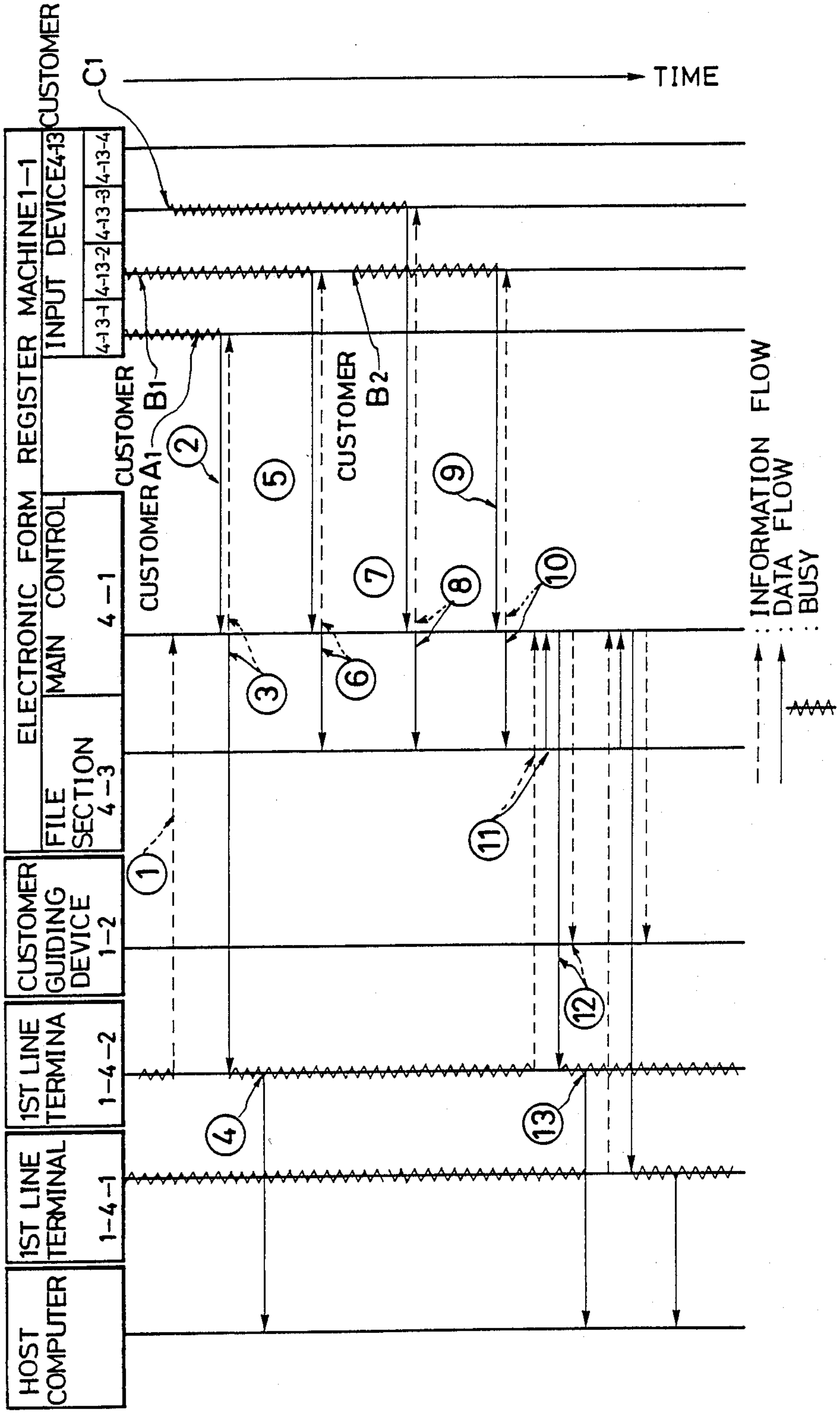
FIG. 12 is an explanatory drawing of the transaction methods accorrding to this invention.

Next, with reference to FIG. 12, an explanation will be given in accordance with the transaction data flow, of the operations of the electronic form register machine 1-1 and processing system for those transactions by electronic form register machine 1-1, 1st line terminals 1-4, customer guiding device 1-2, and the host computer. The following sections, (1)-(13), explain the processing operations designated by the identical numbers in FIG. 12.

(1) While 1st line terminal 1-4-1 is still processing a transaction, the transaction processing of 1st line terminal 1-4-2 is completed. At this point, 1st line terminal 1-4-2 sends the file request information to electronic form register machine 1-1. Main control 4-1 of electronic form register machine 1-1, which has received this file request information through communication section 4-2, then performs the processing steps 1, 2 and 3 in the order shown in the flow chart of FIG. 13.

That is, after memorizing temporarily the number (2 in this example) of the actual processing device which has sent the file request information, an input data block which can be processed immediately is searched for. When there is no input data block which can be processed immediately, the number of the actual processing device which has output the file request information is registered in the file request order queue. An input data block which can be processed immediately means an input data block that is registered in the file section and has a transaction catergory which can be processed by the actual processing device (1st line terminal 1-4-2 in this case) which has sent the file request information.

(2) Here, customers $A_1$, $B_1$ and $C_1$ are inputting data for various transactions, using input device 4-13 of electronic form register machine 1-1. Suppose that customer $A_1$ has just completed first input for a time deposit transaction form image shown in FIG. 6 from input device 4-13-1. At this time, main control 4-1 carries out processing steps 7 and 8 in the order shown in FIG. 14.

In other words, an input data block is composed from the serial number, transaction category, reserve area and input data. Search is done for an actual processing device which is capable of immediate processing. This actual processing device which is capable of immediate processing means a device that is temporarily memorized as a (disengaged) device which output the file request information, and that can process the transaction categories of the input data block. In this embodiment, it is judged whether or not the time deposit transaction selected by customer $A_1$ can be processed by 1st line terminal 1-4-2.

Figure 15:
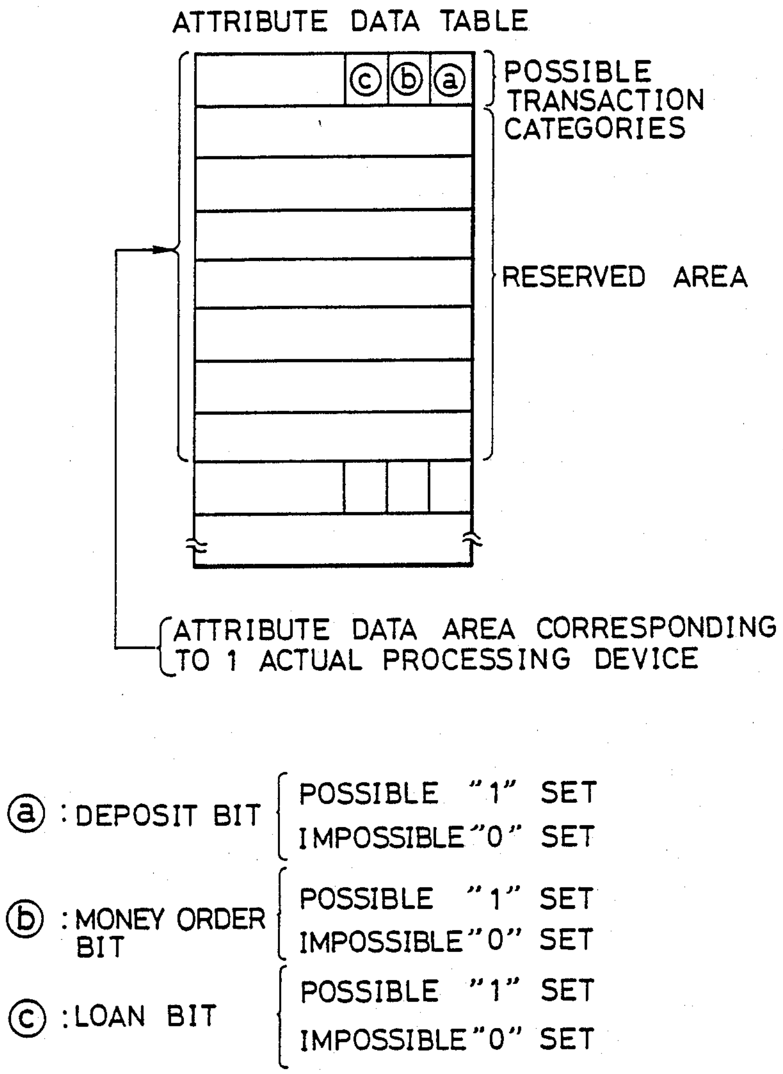
FIG. 15 shows an example of an attribute data table, including table a–c.
Figure 16:
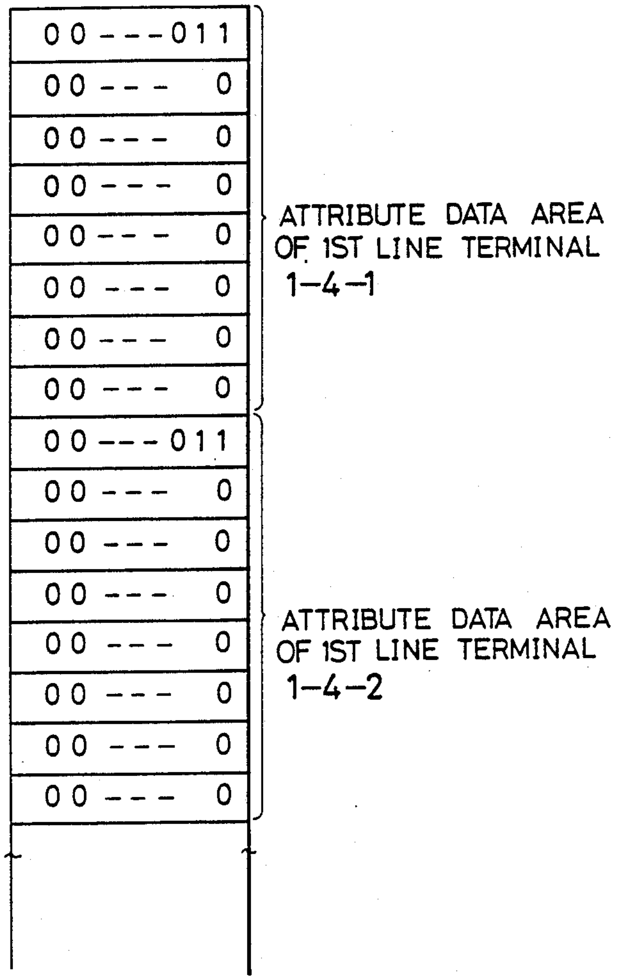
FIG. 16 shows the contents of the attribute data table.

As shown in FIG. 15, an attribute data table is used to check whether or not the transaction can be processed. The attribute data table is on the non-volatile memory (not shown in drawing) in main control 4-1. It has areas to register attribute data corresponding to each actual processing device. For example, 3 areas a, b and c, are arranged for each transaction category: deposits, money orders, loans. Area bit for a possible category is designated as "1." Area bit for impossible category is designated as "0." Settings of "1" and "0" are made in accordance with operations from manager terminals 1-5. These settings can be changed depending on the numbers of customers and tellers. In 1st line terminal 1-4-2, as shown in FIG. 16, deposit and money order are set as possible transaction categories. Main control 4-1 judges that the time deposit transaction selected by customer $a_1$ can be carried out by 1st line terminal 1-4-2.

Figure 14:
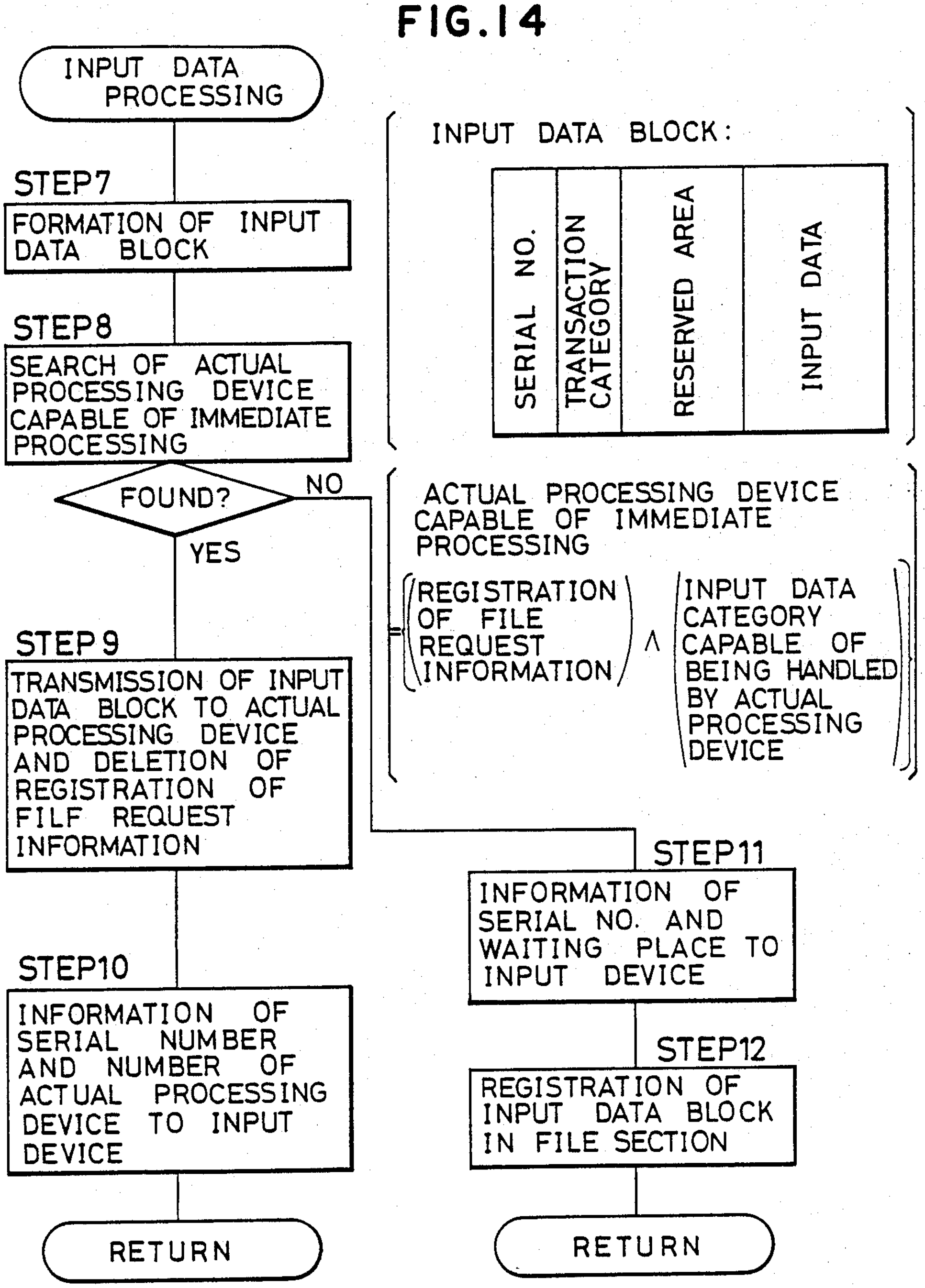
Fig. 14 is a flow chart for operations following completion of customer data input.

(3) When judgment is made that the transaction is possible in process (2) described above, main control 4-1 performs processing steps 9 and 10 with respect to input data block of customer $A_1$ in accordance with a flow chart shown in FIG. 14. That is, at the same time that the input data block is returned to 1st line terminal 1-4-2 through communication section 4-2, information to guide the customer $A_1$ to the 1st line terminal 1-4-2 is given to input device 4-13-1. And the registered file request information output from 1st line terminal 1-4-2 is cancelled. While information to guide customer $A_1$ to 1st line terminal 1-4-2 is shown on display 4-7 of input device 4-13-1 in accordance with information received, a number card with serial number is issued by the receipt printer 4-6.

(4) The serial number is shown on display 10-3 of 1st line terminal 1-4-2, which has received the input data block. At the same time, the input data of time deposit of customer $A_1$ is edited and shown in the appropriate area of the time deposit transaction screen. FIG. 17 shows an example of the image which is displayed on the screen.

The teller in front of the disengaged 1st line terminal 1-4-2 receives from the guided customer $A_1$ the comprehensive account passbook, cash and the number card. First, the teller compares the serial number on the number card with the serial number shown on display 10-3 of 1st line terminal 1-4-2. If there is no inconsistency, it is confirmed that this is the same person who made the data input. Next, the cash which has been received from customer $A_1$ is put into the cash machine 10-7. 1st line terminal 1-4-2 checks the amount of cash that has been put in cash machine 10-7 and then the results are shown on display 10-3 (the calculated cash amount is shown within brackets on the screen in FIG. 17) and on the customer keyboard-display 10-6 together with the customer input cash amount. The teller confirms agreement between the calculated cash amount and the customer input cash amount, and whether or not all data are correct and adequate for this time deposit transaction. 1st line terminal 1-4-2 is informed that the transaction screen activity has been completed by the teller's depression of the special key on keyboard 10-4. At the same time the customer is asked to depress the confirmation key (special key on customer keyboard 10-6) as proof that customer $A_1$ has confirmed the deposit of $1,200. When customer $A_1$ depresses the confirmation key, 1st line terminal 1-4-2 sends to the data center the input data which is shown on the transaction screen, and then deposit processing is performed for the cash of $1,200 in accordance with the response data from the data center while this transaction is registered in the comprehensive account passbook. After registration has been completed, the teller returns the comprehensive account passbook to customer $A_1$, thereby completing the transaction.

(5) After customer $B_1$ has used input device 4-13-2 of the electronic form register machine 1-1 and has completed the withdrawal transaction data input for an ordinary deposit, main control 4-1 performs the processing steps 7 and 8 in the same way as described before. At this point, in this example 1st line terminals 1-4 become all busy.

(6) When it is judged that in process (5) described above, there is no device capable of immediate processing (disengaged device), main control 4-1 performs processing steps 11 and 12. Data block input by customer $B_1$ including the transaction category is registered in file section 4-3 together with the order (serial number) indicating sequence of input completion of customer B1. At the same time, information is shown on the screen of input device 4-13-2 that guides customer B1 to a sofa near customer guiding device 1-2, and a number card is issued with the serial number.

(7),(8) Next is a situation in which customer $C_1$ has completed input for a bank draft remittance from input device 4-13-3 of the electronic form register machine 1-1. When the 1st line terminals 1-4 are all busy, main control 4-1 stores the input data block of customer $C_1$ in file section 4-3 which contains the transaction category, together with the serial number of the customer $C_1$ which is generated by adding "1" and the serial number of customer $B_1$. At the same time, a number card is issued on which the serial number is printed and customer C1 is guided to a sofa by the display of input device 4-13-3.

(9),(10) Suppose the 1st line terminals 1-4 are all busy, when customer $B_2$, who had begun inputting from input device 4-13-2, completed inputting, right after customer $B_1$ had finished inputting from input device 4-13-2 and had been guided to the sofa. In this case, main control 4-1 in the same way as in process (6), stores input data block of the customer $B_2$ in file section 4-3 which contains the transaction category and the serial number generated by adding "1" and the serial number of customer $C_1$. At the same time, a number card is issued on which is printed the serial number, and customer $B_2$ is guided to a sofa by the display of the input device.

Figure 13:
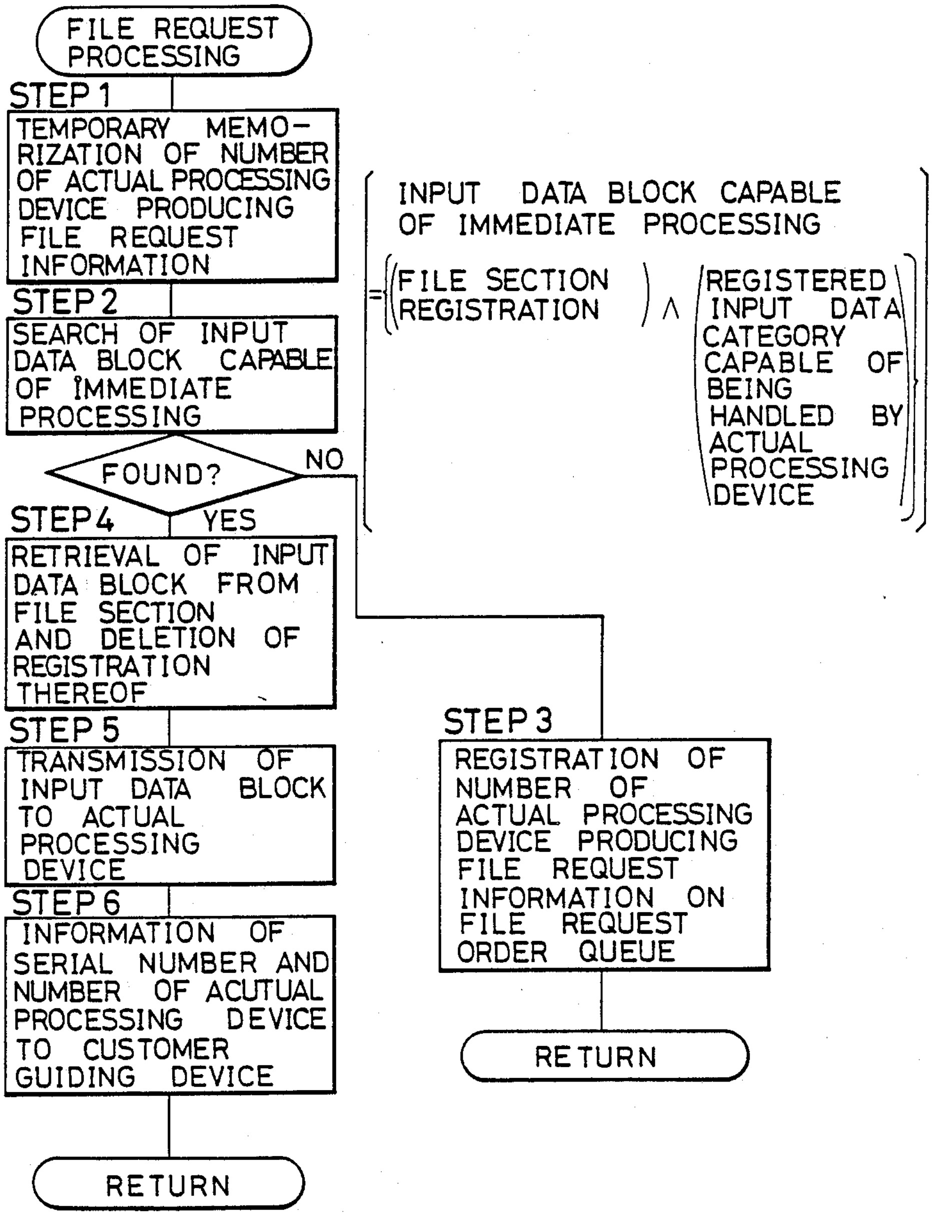
FIG. 13 is a flow chart for file requests and related processes.

(11) Main control 4-1 of electronic form register machine 1-1 performs processing steps 1, 2 and 4 in the order of the flow chart in FIG. 13, when it has received through communication section 4-2 the file request information output from 1st line terminal 1-4-2 which has completed time deposit transaction process of customer $A_1$. Retrieve is made to determine whether or not the data block of a transaction category capable of being processed by 1st line terminals 1-4-2 has been registered in file section 4-3. Among these input data blocks the most early registered (the smallest serial numbered) input data block of customer $B_1$ is retrieved from file section 4-3, and the registration for this input data block is cancelled.

(12) Main control 4-1, through communication section 4-2, does the processing work of steps 5 and 6 in the order shown in FIG. 13. When the input data block of customer $B_1$ is sent to 1st line termial 1-4-2, the serial number given to the customer $B_1$ and the terminal number (2) of 1st line terminal 1-4-2 are informed to customer guiding device 1-2, so that customer $B_1$ will be guided to 1st line terminal 1-4-2.

(13) 1st line terminal 1-4-2 receives the input data block and then the serial number and the input data are shown on display 10-3. The teller takes from customer $B_1$ who has been guided there the passbook and the number card. The teller then compares the serial number on the number card with the serial number on the display. If these numbers are the same, the teller confirms that this is the same person who has input the data. Then it is confirmed that this customer has a legitimate right to make this transaction by using such methods as seal identity check etc. After this, the special key on keyboard 10-4 is depressed, and control 10-1 is informed that the transaction image on the screen has been completed. Customer $B_1$ then confirms the withdrawl money displayed on the customer keyboard/display 10-6. When confirmed, the customer then depresses the confirmation key. When customer $B_1$ depresses the confirmation key, 1st line terminal 1-4-2 sends to the data center the input data which is displayed on the transaction screen. The cash is then paid from cash machine 10-7, following the response from the data center. Passbook registering is performed by printer 10-5.

When the actual processing described here has been completed, the teller gives customer $B_1$ the cash which has been paid and returns the passbook in which the appropriate information has been registered. One transaction has now been completed.

Figure 18:
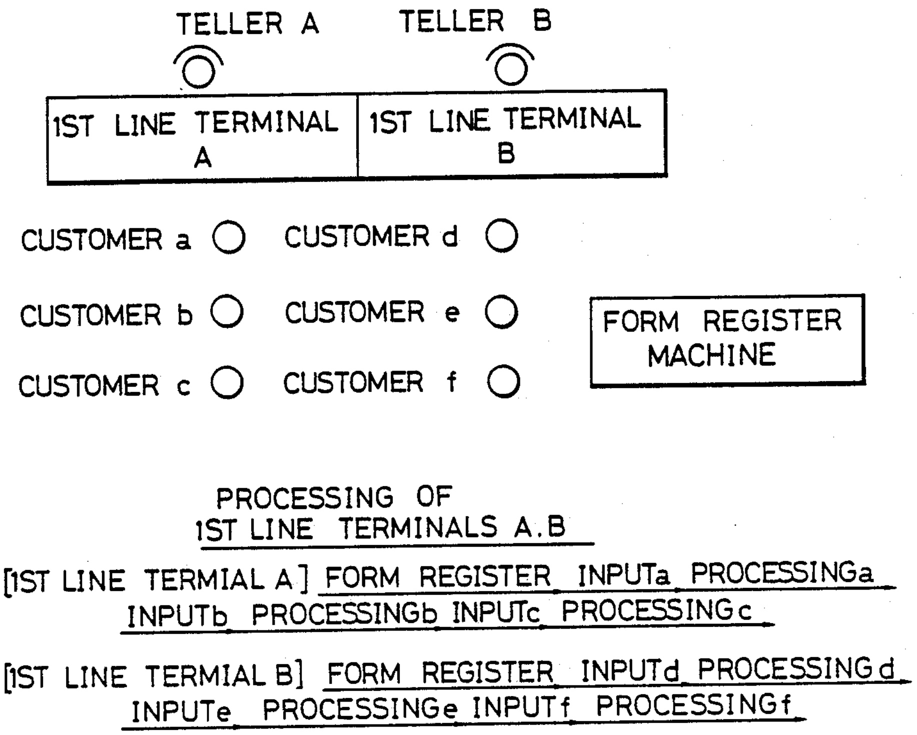
FIG.18 PRIOR ART
FIG. 18, consisting of A and B is an explanatory drawing of processing methed in conventional systems.
Figure 19:
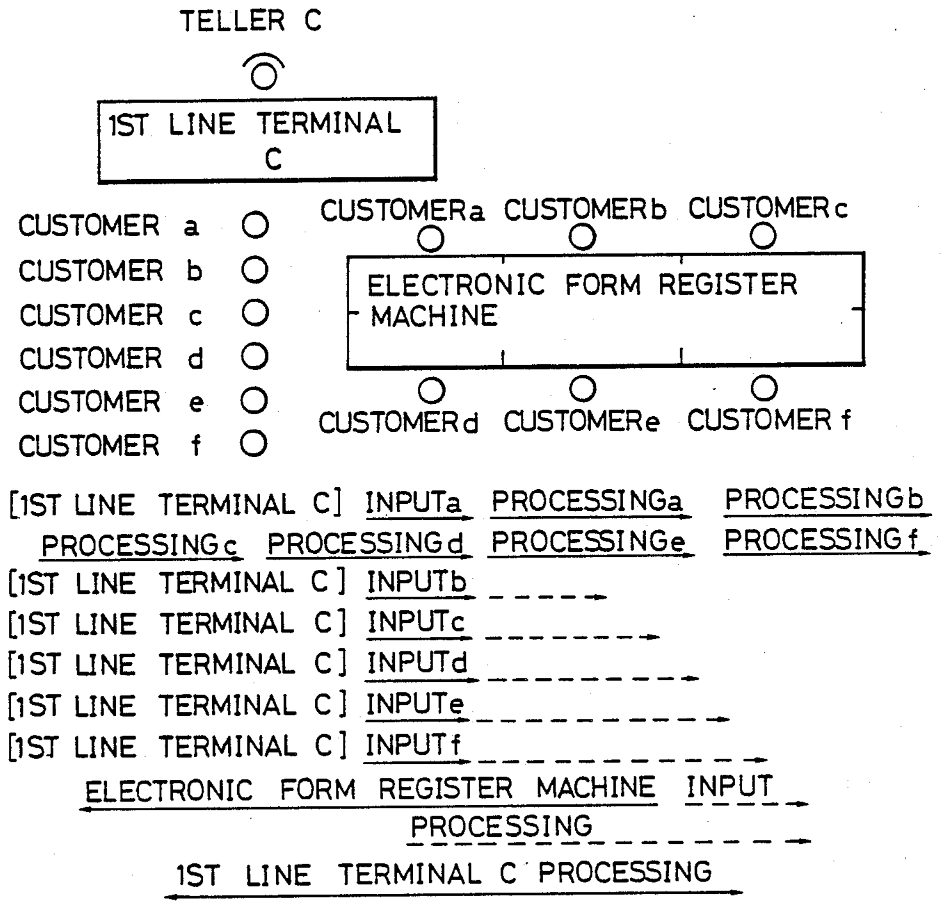
FIG. 19 is an explanatory drawing of processing method in this invention.

Next, FIGS. 18 and 19 will be referred to for comparison with the efficiencies of this invention described here and the prior systems. FIG. 18 shows a 1st line processing system of prior art. Supposing that customers a, b, c, d, e, and f all arrive in the lobby at about the same time, they will all go to the counter where the forms are. After filling out these paper forms and writing in the transaction content, the customers line up in front of 1st line terminals A and B.

As shown in the drawing, customers a, b, and c line up in front of 1st line terminal A, while customers d, e and f line up in front of 1st line terminal B. This means that 1st line terminal A will do the processing work in sequence, first doing the input processing for customer a, then actual processing for customer a; and then for customers b and c. 1st line terminal B also does the processing work in the same way. If customer a needs for filling out forms a lot of time for some reasons, the customers b and c have to wait longer. In addition, data is input through 1st line terminal by a teller who receives from the customer a form which has been filled out. But sometimes the teller will have to make corrections on these forms if something that has been filled in is not clear, or if not enough information has been filled in by the customer. There are many cases when extra input time is required. Time required for actual processing is relatively uniform if the input has been done correctly because input data is processed by machine unless there are mechanical problems.

Next, FIG. 19 shows processing configurations in this invention. When customers a, b, c, d, e and f all arrive in the lobby at about the same time, in the same way as in FIG. 18, each uses an input device in the electronic form register machine. This enables them to input transaction content data more easily than in the case of filling out paper forms. Time required for input completion will vary among customers, a, b, c, d, e and f depending on the transaction category, content etc. But customers who finish input more quickly will be guided to the actual processing area earlier than those customers who finish input more slowly. The customer guiding device is not shown in FIG. 19 in order to make it easier to make comparisons between FIGS. 18 and 19. In FIG. 19, the actual processing device is a 1st line terminal C. 1st line terminal C, in the embodiment shown in the drawing, does the actual processing work for customer b who was the next one to complete input after actual processing work for customer a, whose input completion was the fastest. In the same manner, actual processing works are done for customers c, d, e, and f. A comparison of the examples shown in FIGS. 18 and 19 shows that the situation in FIG. 18 requires a longer time for final processing completion. The reason for this is that input processing time varies according to transaction content and, as shown in FIG. 18, this affects directly the waiting time for the subsequent processing operations. To the contrary, in FIG. 19, input processing is in parallel and actual processing work is done in the same order in which input are completed. Therefore, if there is any delay in input processing, this does not result in other customers having to wait longer. Furthermore, in contrast with the sequential processing in FIG. 18 which involves filling out paper forms, then inputting by the teller, and then doing the actual processing work, the processing situation shown in FIG. 19 is much simpler: electronic form inputting and then actual processing. In the emdodiment shown in FIG. 19, the numbers of 1st line terminals and tellers can be reduced by half because processing has been simplified and parallel processing is performed for complicated input processes. This means that transactions between financial institutions and customers can be conducted by fewer workers with greater efficiency and rationalization.

The electronic form register machine in this embodiment operates in conjunction with all terminals and centers within the place of business or lobby. During customer input processing, this system is able to provide the customer with excellent input guidance and transaction information which is most suited to the customer's needs. Customer service is also improved by shortening the time for transactions and by offering the customer all kinds of information. Furthermore, this invention advances automation because transactions which do not involve subjects such as cash can be completed just by using the electronic form register machine.

Until recently, it has been necessary for customers to fill out forms corresponding to transaction content, and these forms required complicated business processing by workers in the lobby or at the place of business. But the system according to this invention makes it possible to do business without such forms, greatly reducing paper work at the place of business.

What is claimed is:

1. A system for transactions between financial institutions and customers comprising, a first processing device for inputting transaction data by operations of customers, a plurality of second processing devices for performing actual processing on passbook registering, cash depositing, withdrawing, or the like by operations of tellers, a first memory for storing the input transaction data in the same order in which the input has been completed, and a second memory for registering the second processing device which is in a situation capable of immediate processing, wherein when the transaction data input has been completed by the first processing device, the second memory is searched for the second processing device in the situation capable of immediate processing, and when there is the second processing device registered in the second memory, the transaction input data is sent to the second processing device, and when there is no second processing device registered in the second memory, the transaction input data is memorized in the first memory.

2. A system for transactions between financial institutions and customers as set forth in claim 1, wherein when the second processing device changes from a situation incapable of processing to the situation capable of processing, the input transaction data stored first in the first memory is sent to the second processing device.

3. A system for transactions between financial institutions and customers as set forth in claim 1, wherein the first processing device comprises a reading means capable of reading letters or symbols written by hand.

4. A system for transactions between financial institutions and customers as set forth in claim 3, wherein the reading means comprises a digitizer for digitalizing the input letters or symbols with specific resolving power.

5. A system for transactions between financial institutions and customers as set forth in claim 1, wherein the second processing device comprises a first and a second displaying means for displaying the input transaction data to the tellers and the customers respectively.

6. A system for transactions between financial institutions and customers as set forth in claim 5, wherein the first processing device comprises an issuing means for issuing a number card with a serial number corresponding to the order in which the transaction data input has been completed, and the serial number is shown on the first displaying means.

7. A system for transactions between financial institutions and customers as set forth in claim 1, wherein the system further comprises a guiding means for guiding the customers to places in accordance with the result of search of the second memory for the second processing device.

8. A system for transactions between financial institutions and customers as set forth in claim 1, wherein the second processing means is connected to a data center, and the transaction data input from the first processing device is sent to the data center when a specific operation is input from the second processing device.

9. A system for transactions between financial institutions and customers comprising, a first processing device for inputting transaction data by operations of customers, a plurality of second processing devices for performing actual processing on passbook registering, cash depositing, withdrawing, or the like by opperations of tellers, a first memory for storing the input transaction data in the same order in which the input has been completed, and a second memory for registering the second processing device which is in a situation capable of immediate processing, wherein when the second processing device is in the situation capable of immediate processing, the first memory is searched for the stored input transaction data to be processed, and when there is input transaction data to be processed, it is sent to the second processing device, and when there is not input transaction data to be processed, the second processing device is registered in the second memory.

10. A system for transactions between financial institutions and customers comprising, a first processing device for inputting transaction data by operations of customers, a plurality of second processing devices for performing actual processing on passbook registering, cash depositing, withdrawing, or the like by operations of tellers, a first memory for storing the input transaction data in the same order in which the input has been completed, and a second memory for registering the second processing device which is in a situation capable of immediate processing, a third memory memorizing an attribute data indicating categories of input transaction data which can be handled by each second processing device, wherein when the transaction data input has been completed, the second memory is searched for the second processing device capable of immediate processing, and the judgement is made from the attribute data memorized in the third memory whether of not the input transaction data can be handled by the second processing device having been found capable of immediate processing, and when possible, the input transaction data is sent to the second processing device capable of immediate processing, and when impossible, the input transaction data is stored in the first memory.

11. A system for transactions between financial institutions and customers as set forth in claim 10, wherein when the second processing device capable of handling the input transaction data changes from a situation in which immediate processing is impossible to a situation in which immediate prosessing is possible, or when the second processing device capable of immediate processing changes from a situation in which handling of the input transaction data is impossible to a situation in which handling thereof is possible, the input transaction data stored first in the first memory is sent to the second processing device which has changed.

12. A system for transactions between financial institutions and customers as set forth in claim 10, wherein the system further comprises a changing means for changing the attribute data.

13. A system for transactions between financial institutions and customers comprising, a first processing device for inputting transaction data by operations of customers, a plurality of second processing devices for performing actual processing on passbook registering, cash depositing, withdrawing, or the like by operations of tellers, a first memory for storing the input transaction data in the same order in which the input has been completed, and a second memory for registering the second processing device which is in a situation capable of immediate processing, a third memory memorizing an attribute data indicating categories of input transaction data which can be handled by each second processing device, wherein when the second processing means is in a situation capable of immediate processing, the first memory is searched for the transaction data to be processed and judgement is made from the attribute data memorized in the third memory whether or not the transaction data having been found can be handled by the second processing device capable of immediate processing, and when the transaction data having been found can be handled by the second processing device, the former is sent to the latter, and when there is no transaction data which can be handled by the second processing device capable of immediate processing, the second processing device is registered in the second memory.

* * * * *